US008565053B1

(12) United States Patent
Chung

(10) Patent No.: US 8,565,053 B1
(45) Date of Patent: Oct. 22, 2013

(54) METHODS AND DEVICES FOR PREVENTING MEDIA ERRORS DUE TO MEDIA SCRATCHES

(75) Inventor: Heon Ho Chung, Laguna Niguel, CA (US)

(73) Assignee: Western Digital Technologies, Inc., Irvine, CA (US)

(*) Notice: Subject to any disclaimer, the term of this patent is extended or adjusted under 35 U.S.C. 154(b) by 0 days.

(21) Appl. No.: 13/527,492

(22) Filed: Jun. 19, 2012

(51) Int. Cl.
G11B 5/09 (2006.01)

(52) U.S. Cl.
USPC ............ 369/47.14; 369/53.17; 369/53.35; 360/31; 711/112; 714/718; 714/719; 714/6.13; 714/6.22; 714/42; 714/723

(58) Field of Classification Search
None
See application file for complete search history.

(56) References Cited

U.S. PATENT DOCUMENTS

| | | | |
|---|---|---|---|
| 4,939,598 A | 7/1990 | Kulakowski et al. | |
| 5,696,775 A | 12/1997 | Nemazie et al. | |
| 5,937,435 A | 8/1999 | Dobbek et al. | |
| 5,966,726 A | 10/1999 | Sokolov | |
| 6,002,544 A | 12/1999 | Yatsu | |
| 6,018,789 A | 1/2000 | Sokolov et al. | |
| 6,098,185 A | 8/2000 | Wilson | |
| 6,101,065 A | 8/2000 | Alfred et al. | |
| 6,134,214 A | 10/2000 | Takagi et al. | |
| 6,289,484 B1 | 9/2001 | Rothberg et al. | |
| 6,327,106 B1 | 12/2001 | Rothberg | |
| 6,408,357 B1 | 6/2002 | Hanmann et al. | |
| 6,412,089 B1 | 6/2002 | Lenny et al. | |
| 6,429,984 B1 | 8/2002 | Alex | |
| 6,442,715 B1 | 8/2002 | Wilson | |
| 6,532,517 B1 | 3/2003 | Wagner et al. | |
| 6,535,995 B1 | 3/2003 | Dobbek | |
| 6,545,835 B1 | 4/2003 | Codilian et al. | |
| 6,606,211 B1 | 8/2003 | Lim et al. | |
| 6,611,393 B1 | 8/2003 | Nguyen et al. | |
| 6,628,466 B2 | 9/2003 | Alex | |
| 6,650,492 B2 | 11/2003 | Lenny et al. | |
| 6,654,193 B1 | 11/2003 | Thelin | |
| 6,687,850 B1* | 2/2004 | Rothberg | 714/6.12 |
| 6,690,523 B1 | 2/2004 | Nguyen et al. | |
| 6,707,635 B1 | 3/2004 | Codilian et al. | |
| 6,710,953 B1 | 3/2004 | Vallis et al. | |
| 6,745,283 B1 | 6/2004 | Dang | |

(Continued)

OTHER PUBLICATIONS

Charles M. Kozierok, ("Logical Block Addressing (LBA)"), Apr. 17, 2001, pp. 1-2, http://www.pcguide.com/ref/hdd/bios/modesLBA-c.html.

(Continued)

Primary Examiner — John Trimmings

(57) ABSTRACT

A method of operating a disk drive comprises scanning each Logical Block Address (LBA) of the disk drive to detect a read error or reading the LBA from a media defect list. The LBA may then be converted to a corresponding physical location on the media and a scan of the corresponding physical location and of nearby physical locations that are within a proximity threshold of the corresponding physical locations may be performed to find media defects. Based thereon, it may then be determined whether a media scratch is present and at least one or more data sectors associated with the media scratch may be relocated to a spare location on the media if the media scratch is determined to be present. If the media scratch is determined not to be present, only the data sector associated with the corresponding physical location may be relocated to the spare location.

28 Claims, 5 Drawing Sheets

(56) References Cited

U.S. PATENT DOCUMENTS

| | | | |
|---|---|---|---|
| 6,795,894 B1 | 9/2004 | Neufeld et al. | |
| 6,809,893 B2 | 10/2004 | Uzumaki et al. | |
| 6,842,801 B2 | 1/2005 | Yamada | |
| 6,854,022 B1 | 2/2005 | Thelin | |
| 6,928,525 B1 | 8/2005 | Ebner et al. | |
| 6,947,234 B2 | 9/2005 | Lamberts et al. | |
| 6,950,967 B1 | 9/2005 | Brunnett et al. | |
| 6,973,553 B1 | 12/2005 | Archibald, Jr. et al. | |
| 6,995,933 B1 | 2/2006 | Codilian et al. | |
| 7,072,129 B1 * | 7/2006 | Cullen et al. | 360/31 |
| 7,099,993 B2 | 8/2006 | Keeler | |
| 7,106,547 B1 | 9/2006 | Hargarten et al. | |
| 7,143,203 B1 | 11/2006 | Altmejd | |
| 7,173,782 B2 | 2/2007 | Ikeda et al. | |
| 7,274,639 B1 | 9/2007 | Codilian et al. | |
| 7,345,837 B1 | 3/2008 | Schreck et al. | |
| 7,461,202 B2 | 12/2008 | Forrer, Jr. et al. | |
| 7,477,465 B2 | 1/2009 | Yu | |
| 7,562,282 B1 | 7/2009 | Rothberg | |
| 7,626,908 B2 | 12/2009 | Nakagawa et al. | |
| 7,817,363 B2 | 10/2010 | O'Brien et al. | |
| 7,823,011 B2 | 10/2010 | Dholakia et al. | |
| 7,929,234 B1 | 4/2011 | Boyle et al. | |
| 7,971,093 B1 * | 6/2011 | Goel et al. | 714/6.13 |
| 8,004,785 B1 | 8/2011 | Tsai et al. | |
| 2002/0184580 A1 * | 12/2002 | Archibald et al. | 714/719 |
| 2003/0031106 A1 | 2/2003 | Ozaki | |
| 2003/0174549 A1 | 9/2003 | Yaguchi et al. | |
| 2006/0066971 A1 | 3/2006 | Alex et al. | |
| 2006/0203661 A1 | 9/2006 | Chen et al. | |
| 2007/0174682 A1 * | 7/2007 | King | 714/8 |
| 2008/0082778 A1 | 4/2008 | Inoue et al. | |
| 2008/0130153 A1 | 6/2008 | Lee et al. | |

OTHER PUBLICATIONS

Charles M. Kozierok, ("Seek Time"), Apr. 17, 2001, pp. 1-3, http://www.pcguide.com/ref/hdd/perf/perf/spec/posSeek-c.html.

Walter A. Burkhard et al., Rotational Position Optimization (RPO) Disk Scheduling, First Conference on File and Storage Technologies (Fast '02), Jul. 16, 2001, pp. 1-11.

* cited by examiner

| TRACK NUMBER | Sector 2 | Sector 3 | Sector 4 | Sector 5 |
|---|---|---|---|---|
| TRACK 100 | | | | |
| TRACK 101 | | | | |
| TRACK 102 | | | | |
| TRACK 103 | | | | |
| TRACK 104 | | | | |
| TRACK 105 | | | | |
| TRACK 106 | | | | |
| TRACK 107 | | | | |
| TRACK 108 | | | 400 | |
| TRACK 109 | | | | |
| TRACK 110 | | | | |
| TRACK 111 | | | | |
| TRACK 112 | | | | |
| TRACK 113 | | | | |
| TRACK 114 | | | | |
| TRACK 115 | | | | |
| TRACK 116 | | | | |
| TRACK 117 | | | | |
| TRACK 118 | | | | |
| TRACK 119 | | | | |

FIG. 4

| TRACK NUMBER | Sector 2 | Sector 3 | Sector 4 | Sector 5 |
|---|---|---|---|---|
| TRACK 100 | 0 BITS CORRUPTED | 0 BITS CORRUPTED | 0 BITS CORRUPTED | 0 BITS CORRUPTED |
| TRACK 101 | 0 BITS CORRUPTED | 0 BITS CORRUPTED | 0 BITS CORRUPTED | 0 BITS CORRUPTED |
| TRACK 102 | 0 BITS CORRUPTED | 0 BITS CORRUPTED | 0 BITS CORRUPTED | 0 BITS CORRUPTED |
| TRACK 103 | 0 BITS CORRUPTED | 0 BITS CORRUPTED | 0 BITS CORRUPTED | 0 BITS CORRUPTED |
| TRACK 104 | 0 BITS CORRUPTED | 0 BITS CORRUPTED | 6 BITS CORRUPTED | 0 BITS CORRUPTED |
| TRACK 105 | 0 BITS CORRUPTED | 0 BITS CORRUPTED | 15 BITS CORRUPTED | 0 BITS CORRUPTED |
| TRACK 106 | 0 BITS CORRUPTED | 0 BITS CORRUPTED | 30 BITS CORRUPTED | 0 BITS CORRUPTED |
| TRACK 107 | 0 BITS CORRUPTED | 0 BITS CORRUPTED | 50 BITS CORRUPTED | 0 BITS CORRUPTED |
| TRACK 108 | 0 BITS CORRUPTED | 0 BITS CORRUPTED | 80 BITS CORRUPTED | 0 BITS CORRUPTED |
| TRACK 109 | 0 BITS CORRUPTED | 30 BITS CORRUPTED | 110 BITS CORRUPTED | 0 BITS CORRUPTED |
| TRACK 110 | 0 BITS CORRUPTED | 100 BITS CORRUPTED | 50 BITS CORRUPTED | 0 BITS CORRUPTED |
| TRACK 111 | 0 BITS CORRUPTED | 120 BITS CORRUPTED | 0 BITS CORRUPTED | 0 BITS CORRUPTED |
| TRACK 112 | 0 BITS CORRUPTED | 110 BITS CORRUPTED | 0 BITS CORRUPTED | 0 BITS CORRUPTED |
| TRACK 113 | 0 BITS CORRUPTED | 70 BITS CORRUPTED | 0 BITS CORRUPTED | 0 BITS CORRUPTED |
| TRACK 114 | 0 BITS CORRUPTED | 50 BITS CORRUPTED | 0 BITS CORRUPTED | 0 BITS CORRUPTED |
| TRACK 115 | 0 BITS CORRUPTED | 12 BITS CORRUPTED | 0 BITS CORRUPTED | 0 BITS CORRUPTED |
| TRACK 116 | 0 BITS CORRUPTED | 7 BITS CORRUPTED | 0 BITS CORRUPTED | 0 BITS CORRUPTED |
| TRACK 117 | 0 BITS CORRUPTED | 0 BITS CORRUPTED | 0 BITS CORRUPTED | 0 BITS CORRUPTED |
| TRACK 118 | 0 BITS CORRUPTED | 0 BITS CORRUPTED | 0 BITS CORRUPTED | 0 BITS CORRUPTED |
| TRACK 119 | 0 BITS CORRUPTED | 0 BITS CORRUPTED | 0 BITS CORRUPTED | 0 BITS CORRUPTED |

FIG. 5

METHODS AND DEVICES FOR PREVENTING MEDIA ERRORS DUE TO MEDIA SCRATCHES

BACKGROUND

In disk drives, defects on the media surface can cause the read channel to repeatedly detect incorrect data (hard errors). Very large defects may result in hard errors that are too long for the disk drive ECC algorithm to correct. Defect scans are used in the manufacturing process to flag those sectors with large defects so they are excluded from use during normal drive operation.

At the factory, based upon the number of detected defects, it may be determined whether the disk drive is useable or not. The disk drive may fail the manufacturing process when too many defects are detected. Conventionally, if the disk drive is determined to be usable given the number and severity of the detected defects, a predetermined space around the detected defect is designated as a margin, which becomes designated as being thereafter unavailable for user data. Moreover, although every effort is made to seal the drive during manufacturing, contaminants may still become sealed therein. Such contaminants may, after the drive is shipped to the customer and put into use, cause scratches on the media. Some scratches, or portions thereof, are sufficiently shallow as to be properly handled by the error correction in the firmware. Other scratches may be too deep for the firmware error correction to correct. Conventionally, media defects are detected, mapped and margined during the manufacturing process. Consequently, when a drive leaves the factory, is shipped to the customer and put to use in the field, it is assumed that the probability of finding any new defects is low. Therefore, the drive's capacity to accommodate new defects in the field, such as scratches, is limited. Such media defects that occur or are discovered as a result of user operations of the disk drive, however, do occur and should be addressed.

BRIEF DESCRIPTION OF THE DRAWINGS

FIG. 4 shows a scratch spanning across a plurality of data sectors and tracks of the media, according to one embodiment.

FIG. 5 shows a detected scratch mapped across a plurality of data sectors and tracks of the media using an error correcting code (ECC) scan and the margining of such detected scratch, according to one embodiment.

DETAILED DESCRIPTION

Figure 1:
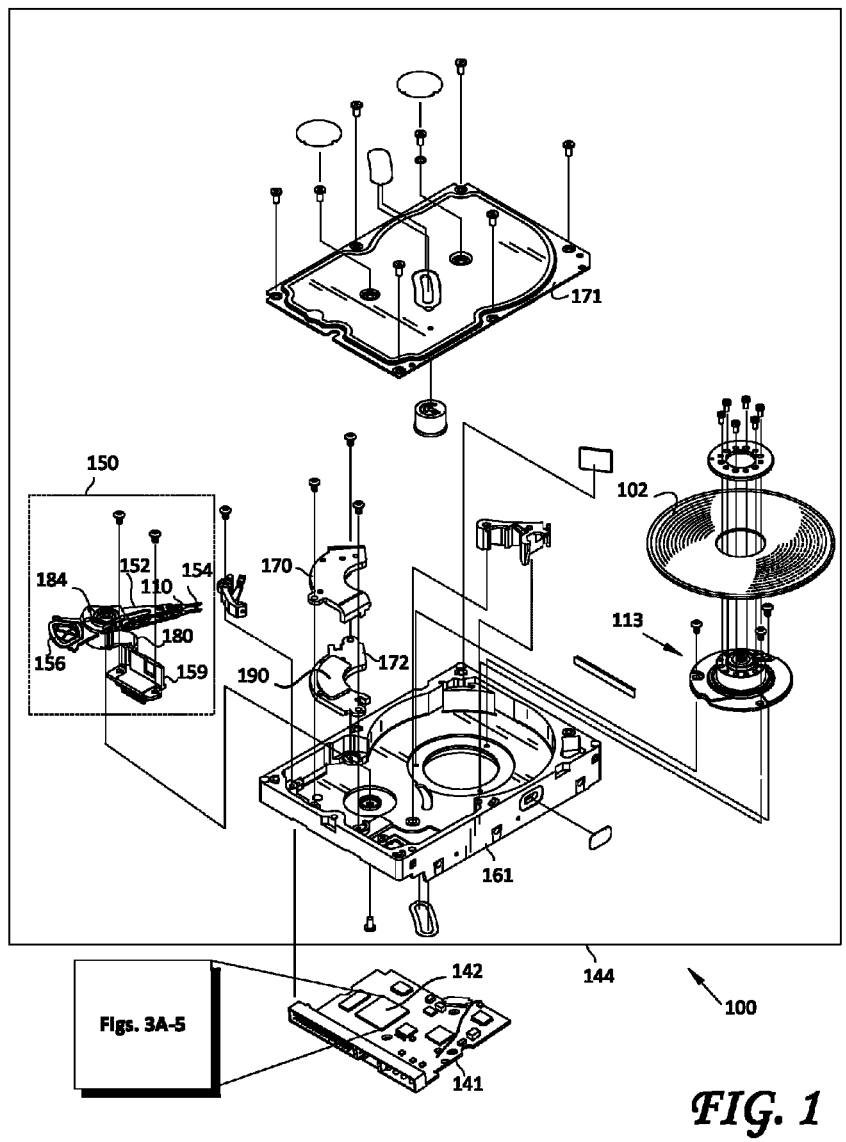
FIG. 1 shows major components of a disk drive, according to one embodiment.

FIG. 1 shows the principal components of an exemplary magnetic disk drive 100 constructed in accordance with one embodiment. With reference to FIG. 1, the disk drive 100 comprises a head disk assembly (HDA) 144 and a printed circuit board assembly (PCBA) 141. The HDA 144 may comprise a base 161 and a cover 171 attached to the base 161 that collectively house a disk 102 or a stack of two or more such disks 102, according to one embodiment. The HDA 144 also includes a spindle motor 113 attached to the base 161 for rotating the disk 102, an HSA 150, and a pivot bearing cartridge 184 that rotatably supports the head stack assembly (HSA) 150 on the base 161. The spindle motor 113 rotates the disk 102 at a constant angular velocity. The HSA 150 comprises a swing-type or rotary actuator assembly 152, at least one head gimbal assembly (HGA) 110 coupled to a load beam that includes a flexure and a flex circuit cable assembly. The rotary actuator assembly 152 includes a body portion, at least one actuator arm cantilevered from the body portion, and a coil portion 156 cantilevered from the body portion in an opposite direction from the actuator arm. The actuator arm supports the HGA 110 that, in turn, includes and supports the slider(s) 154. The flex circuit cable assembly may include the flexible cable 180 and a flex clamp 159. The HSA 150 is pivotally secured to the base 161 via the pivot-bearing cartridge 184 so that the slider at the distal end of the HGA 110 may be moved over the surfaces of the disk(s) 102. The pivot-bearing cartridge 184 enables the HSA 150 to pivot about a pivot axis. The storage capacity of the HDA 144 may be increased by, for example, increasing the tracks per inch (TPI) density on the disk 102 and/or by including additional disks 102 in a disk stack and by an HSA 150 having a vertical stack of HGAs 110 supported by a rotary actuator assembly 152 having multiple actuator arms. The "rotary" or "swing-type" actuator assembly 152 rotates on the pivot bearing 184 cartridge about its pivot axis between limited positions and further includes a coil portion 156 that extends from one side of the body portion to interact with one or more permanent magnets 190 mounted to back irons 170, 172 to form a voice coil motor (VCM). The VCM causes the HSA 150 to pivot about the actuator pivot axis to cause the slider and the read-write heads thereof to sweep radially over the disk(s) 102. The PCBA 141 includes a processor 142 and control circuitry configured to read data from and write data to the disk(s) 102 and to prevent media errors due to media scratches by, for example, carrying out the methods and margining functionality described and shown herein relative to FIGS. 3A-5.

Figure 2:
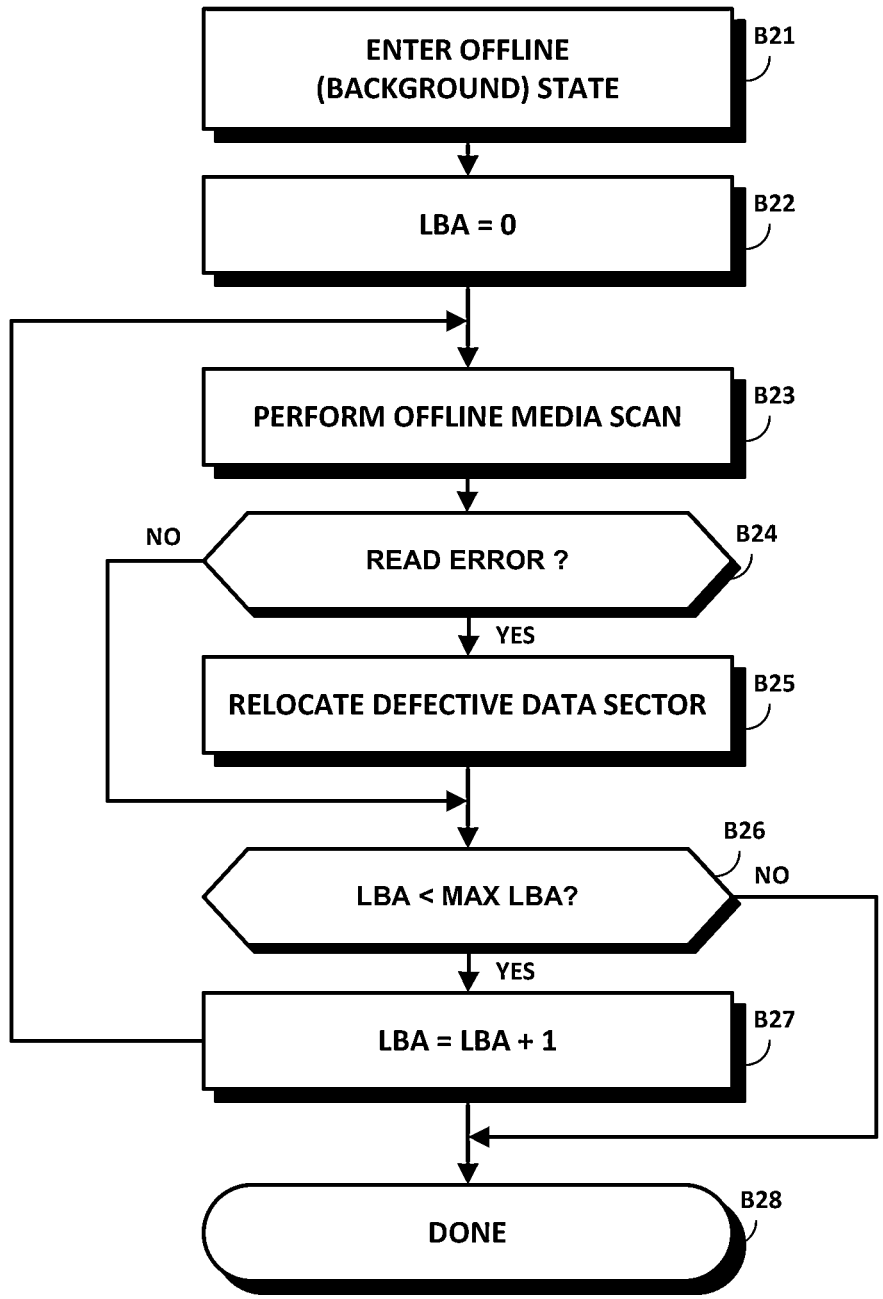
FIG. 2 is a flowchart of a conventional method for performing a defect scan.

FIG. 2 is a flowchart of a conventional method for performing a defect scan. To do so, the disk drive enters an offline state (as such is called in Advanced Technology Attachment (ATA) drives) or a background state (as such is called in Serial Attached SCSI (SAS) drives) as shown in Block B21 and scans all Logical Block Addresses (LBA), as shown at Block B22 to B27. If the drive finds media defect during offline or background state, the media defect sector is relocated. As shown at Block B22, the offline or background scan begins at the first LBA, such as LBA 0. The current (0 in this case) LBA is scanned, using internal read verify command, as suggested at Block B23. At Block B24, it is determined whether a read error has occurred. If a read error has occurred (YES branch of B24), the defective data sector at the current LBA is relocated to a spare location on the disk, as shown at B25. If no read error has occurred (NO branch of Block B24), it is determined at B26 whether the offline or background scan has reached the maximum LBA of the disk by determining whether the current LBA is less than the maximum LBA on the disk. If the current LBA is indeed less than the maximum LBA (YES branch of B26), the current LBA is incremented to the next LBA, as shown at B27. Thereafter, the offline or background scan reverts back to Block B23 to perform the offline media scan on the next LBA. This process continues until the current LBA reaches the maximum LBA on the disk (as shown be the NO branch of B26), whereupon the offline or background scan ends at Block B28.

Figure 3A:
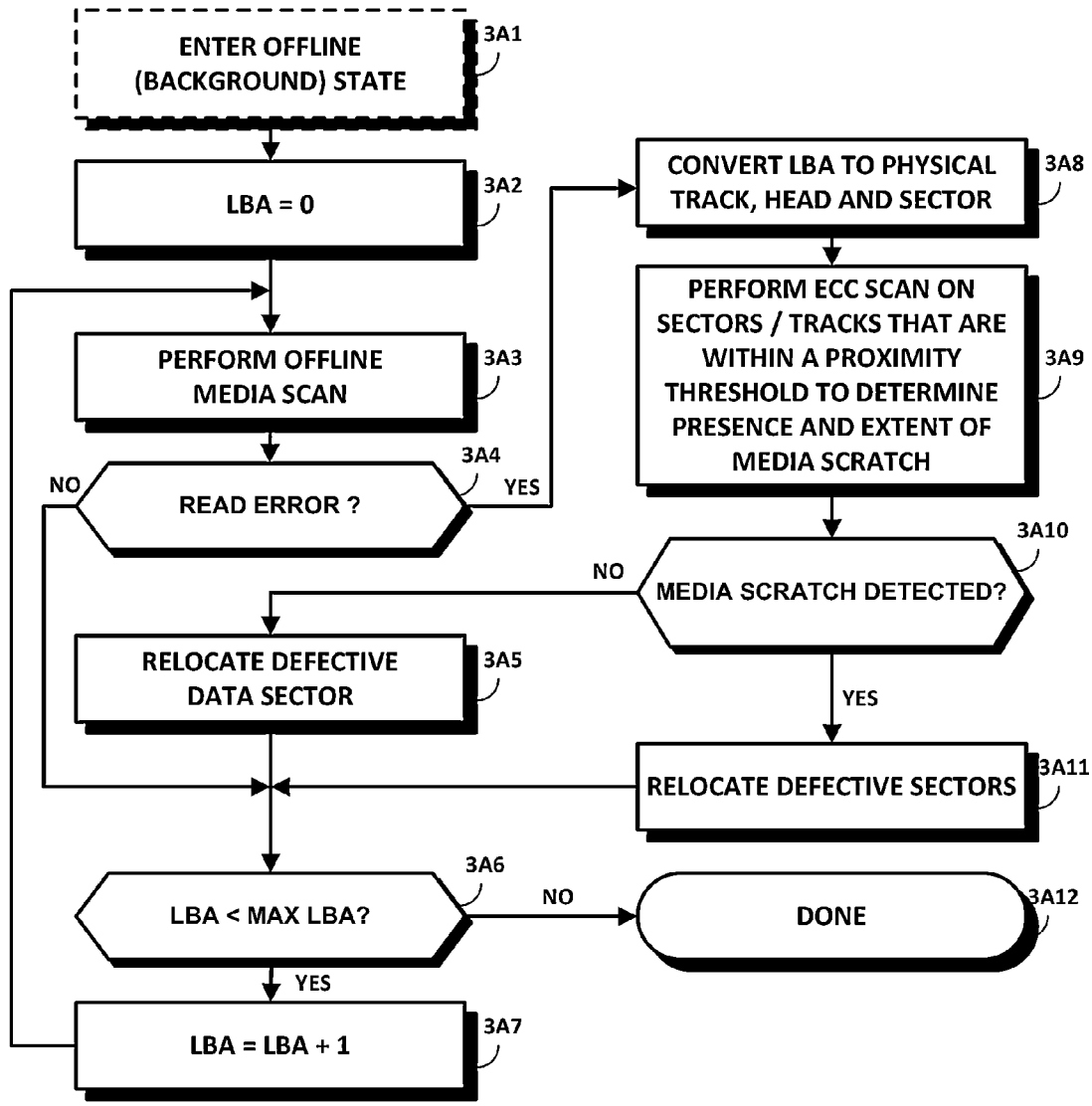
FIG. 3A is a flowchart of a method for preventing media errors due to scratches on the media, according to one embodiment.

FIG. 3A is a flowchart of a method for preventing media errors due to scratches on the media, according to one embodiment. As shown by the dashed lines of Block 3A1, the method may optionally comprise entering a background or offline state, to carry out the functionality of one or more of the blocks shown in FIG. 3A. Moreover, one or more of the blocks may be interrupted in order to carry out the processing of host commands. Starting at the first LBA of the disk (such as LBA 0, for example) as shown at Block 3A2, the controller 142 (FIG. 1) may carry out an offline media scan, as shown at 3A3, to scan each LBA of the media of the disk drive to detect a read error. In so doing, the drive may determine whether a read error occurred on the current LBA, as shown at Block 3A4. If no read error is detected (NO branch of 3A4), it is then determined at Block 3A6 whether the current LBA is less than the maximum LBA of the disk drive. If the media scan has not reached the maximum LBA (YES branch of 3A6), the LBA is incremented at 3A7 whereupon the scan is continued at 3A3. If the maximum LBA has been reached (NO branch of 3A6), the offline or background media scan is finished and the method ends at Block 3A12.

If, however, a read error is detected at (YES branch of Block 3A4), the LBA associated with the read error may be converted to a corresponding physical location on the media. As shown at Block 3A8, the LBA may be converted to a physical location at least partially defined by the identification of a track, head and sector. An ECC scan of the corresponding physical location and of physical locations that are within a proximity threshold (e.g., physical locations that are near the physical location where the read error was encountered at 3A4) may be carried out to find media defects, as shown at 3A9. Such media defects may be limited to a single data sector or may span one or more data sectors and/or tracks on the disk. The presence of media defects causing read errors on adjacent data sectors and/or tracks may be indicative of a media scratch, as opposed to an isolated defective data sector. Indeed, as shown at 3A10, in the case wherein a scratch is not detected at 3A10, it is likely that the read error is limited to only a single data sector and the method may revert to Block 3A5, as shown by the NO branch of 3A10. If Block 3A10 determines the likely presence of a media scratch, (YES branch of 3A10), Block 3A11 may be carried out to relocate at least data sectors associated with the media scratch to a spare location on the disk. Such relocated data sectors may be made unavailable for further data storage or retrieval and an exception list may be accordingly updated, to alert the drive's firmware that the data stored at the relocated data sectors has been relocated to new LBAs in a spare location on the disk drive. The method may then revert back to Block 3A6, to process the next LBA (Block 3A7), unless the maximum LBA of the disk drive has been reached, as determined at 3A6. In processing next LBAs, it is to be understood that the drive may be caused to skip performing the offline or background scan on data sectors that have been relocated at 3A11.

As noted above, the offline or background media scan to scan physical locations within a proximity threshold may be carried out at 3A9 by scanning across one or more data sectors and/or one or more tracks surrounding the physical location where the read error was detected at Block 3A4. Such scanning may be carried out until no further media defects are found in physical locations within the proximity threshold. The thus detected read errors may, accordingly, span one or more sectors and/or one or more tracks of the media. A scratch may be present on the media when Block 3A10, for example, finds a media defect on two or more adjacent physical locations on the media. By noting the track number(s) and sector (s) at which a media defect is detected at 3A10, the media scratch may be mapped across one or more tracks and one or more sectors of the media.

Figure 3B:
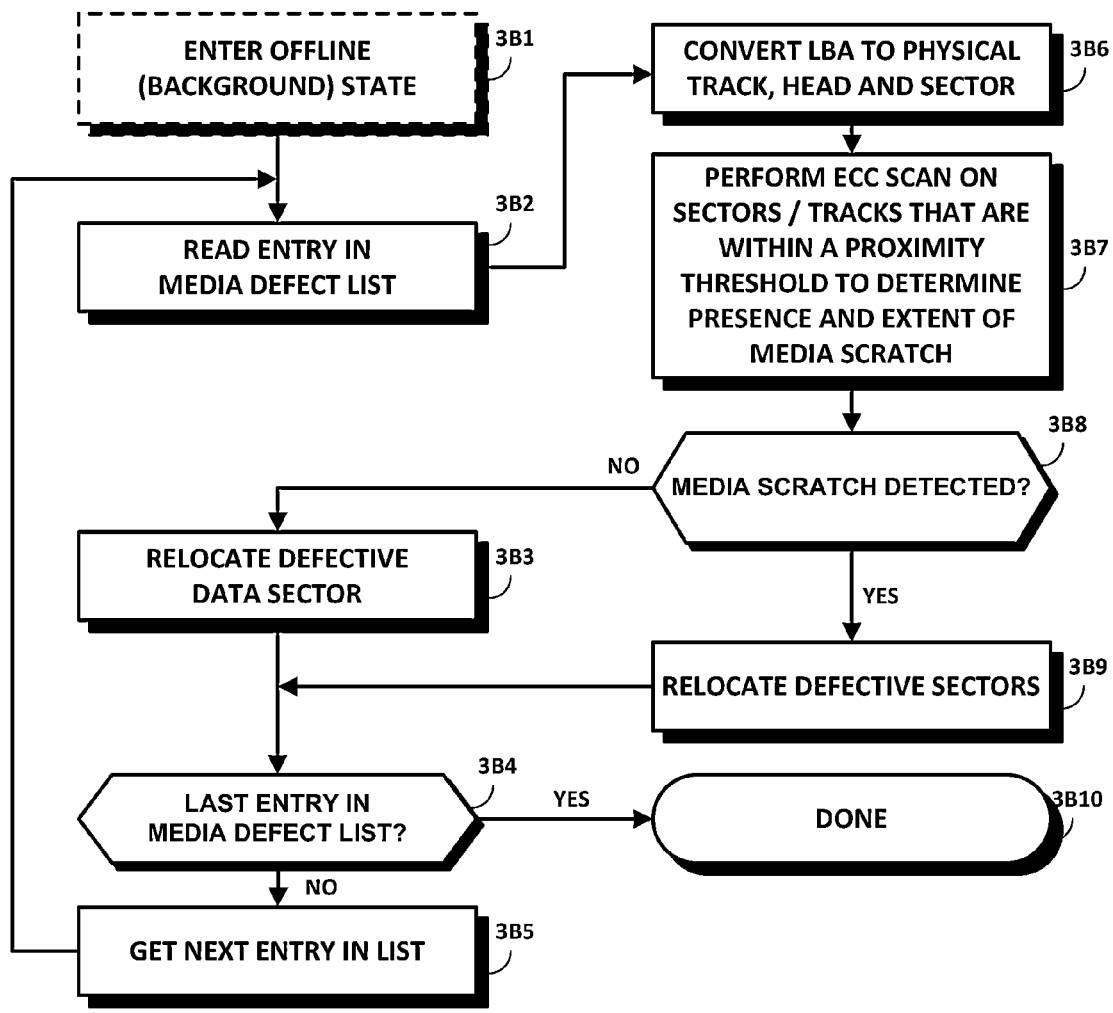
FIG. 3B is a flowchart of a method for preventing media errors due to scratches on the media, according to one embodiment.

FIG. 3B is a flowchart of a method for preventing media errors due to scratches on the media, according to one embodiment. As shown by the dashed lines of Block 3B1, the method may optionally comprise entering a background or offline state, to carry out the functionality of one or more of the blocks shown in FIG. 3B. Moreover, one or more of the blocks may be interrupted in order to carry out the processing of host commands. As shown at Block 3B2, the controller 142 (FIG. 1) may read an entry in a media defect list. For example, the media defect list may be updated when a data access operation results in a read error during, for example, user operations. Should the media defect list be empty, the method may end at 3B10. Assuming, however, that the media defect list has at least one entry therein, that entry is read at Block 3B2 and the LBA thereof is converted to a corresponding physical location on the media. As shown at Block 3B6, the LBA of the read error may be converted to a physical location at least partially defined by the identification of a track, head and sector. An ECC scan of the corresponding physical location and of physical locations that are within a proximity threshold (e.g., physical locations that are near the physical location of the read entry in the media defect list) may be carried out to find media defects, as shown at 3B7. Such media defects may be limited to a single data sector or may span one or more data sectors and/or tracks on the disk. The presence of media defects causing read errors on adjacent data sectors and/or tracks may be indicative of a media scratch, as opposed to an isolated defective data sector. Indeed, in the case wherein a scratch is not detected at 3B8, it is likely that the read error is limited to only a single data sector and the method may proceed to Block 3B3, as shown by the NO branch of 3B8. In this case, the single data sector may be relocated, as shown at 3B3. If Block 3B8 determines the likely presence of a media scratch, (YES branch of 3B8), Block 3B9 may be carried out to relocate at least data sectors associated with the media scratch to a spare location on the disk. Such relocated data sectors may be made unavailable for further data storage or retrieval and an exception list may be accordingly updated, to alert the drive's firmware that the data stored at the relocated data sectors has been relocated to new LBAs in a spare location on the disk drive. The method may then proceed (either from Block 3B3 or from Block 3B9 to Block 3B4) to Block 3B4, whereupon it is determined whether the last entry in the media defect list has been reached. If the last entry in the media defect list has, indeed, been reached (YES branch of 3B4), the method may end at Block 3B10. If, however, it is determined that the last entry in the media defect list has not been reached (NO branch of 3B4), then the next entry in the media defect list may be read, as shown at Blocks 3B5 and 3B2. In processing next entry in the media defect list, it is to be understood that the drive may be caused to skip performing the offline or background scan on data sectors that have been relocated at 3B9.

As noted above, the offline or background media scan to scan physical locations within a proximity threshold may be carried out at 3B8 by scanning across one or more data sectors and/or one or more tracks surrounding the physical location corresponding to the current entry in the media defect list. Such scanning may be carried out until no further media defects are found in physical locations within the proximity threshold. The thus detected read errors may, accordingly, span one or more sectors and/or one or more tracks of the media. A scratch may be present on the media when Block 3B8, for example, finds a media defect on two or more adjacent physical locations on the media. By noting the track number(s) and sector(s) at which a media defect is detected at 3B8, the media scratch may be mapped across one or more tracks and one or more sectors of the media.

FIG. 4 shows an exemplary scratch 400 mapped across a plurality of data sectors and tracks of the disk, according to one embodiment. As shown, scratch 400 spans across sectors 3 and 4 and extends from track 104 toward the outer diameter (OD) of the disk (such as disk 102 in FIG. 1) to track 115 toward the inner diameter (ID) of the disk 102. The data sectors at which such scratch 400 is present may or may not be suitable for data storage. For example, such suitability may depend on the depth of the scratch, which may be related to the damage caused by the scratch to the underlying magnetic layer(s) on the media. The scratch 400 may have locally different depths, which different depths may affect the underlying data sector's ability to store data. If the depth is sufficiently shallow, the firmware's ECC may be up to the task of correcting any bits corrupted by the scratch. If, however, the local depth of the scratch causes such damage to the underlying magnetic layer that the corresponding data sector's ability to store data is compromised, the firmware's ECC may not be able to correct the number of corrupted bits read during the scan.

FIG. 5 shows the detected scratch mapped across a plurality of data sectors and tracks of the media and the margining of such detected scratch, according to one embodiment. FIG. 5 shows the same scratch 400 mapped across a plurality of sectors and tracks of the disk 102. As shown in FIG. 5, the ECC scan of Block 3A9 in FIG. 3A and/or 3B7 in FIG. 3B may be configured to determine the number of corrupted bits read (1) from the physical location where the read error was detected at Block 3A4 in FIG. 3A and/or corresponding to an LBA obtained from the media defect list at Block 3B2 in FIG. 3B and (2) from the physical locations within the proximity threshold, as shown at Block 3A9 in FIG. 3A and/or Block 3B7 in FIG. 3B. For example, the proximity threshold may be set to 1 sector/track so that if a number of continuous sectors with read errors found is interrupted by 1 sector/track, the scanning would terminate. Other proximity thresholds such as 2 or 3 or more sectors/tracks may be used. To perform the scan, for example, the data sectors may be read in Error Correction Code (ECC) scan mode (a hardware function), by which the number of corrupted bits may be determined, as shown at sector 3, tracks 109 to 116 and at sector 4, tracks 104 to 110, as shown in FIG. 5. As shown at Block 3A11 and as also suggested at shape 502 in FIG. 5, the data sectors at which the error was detected at 3A4 and data sectors within the proximity threshold at which the ECC scan of Block 3A9 found corrupted data bits may be relocated to a spare location on the disk 102. Although sectors with read errors are indicated by the presence of any corrupted bits in the example of FIG. 5 (versus those sectors with 0 bits corrupted), read errors may be defined differently in other embodiments where sectors with bit errors below a certain threshold number may not be counted as read errors. In any case, based on the scan results the media scratch is may be mapped out and an exception list may be suitably updated, to indicate the new LBA of the relocated data sectors and to disallow further use of the LBAs of the relocated data sectors.

As shown at shape 504 (bounded by track 102—sectors 2-5 and track 118, sectors 2-5), margining may be carried out on one or more data sectors surrounding the mapped media scratch 400. Thereafter, the margined data sectors may also be relocated to the spare location on the media and the exception list updated accordingly. The margins, in both the track directions and in the sector directions may be freely selected. Indeed, a variety of margining schemes may be implemented. For example, a rectangular grouping of data sectors surrounding the mapped media scratch 400 may be selected for margining, as shown at 504. Alternatively, margined data sectors surrounding the mapped media scratch 400 may define a more irregular shape such as suggested at 506 (shape 504 minus carve-outs at sector 2 of tracks 102-106 and sector 5 of tracks 113-118) that, for example, more closely mirrors the shape and orientation of the mapped media scratch 400 while still maintaining adequate margins around the media scratch 400. Such alternative may be effective in limiting the number of margined and relocated data sectors, for example.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures (such as, for example, the offline or background scan used or the margining scheme) may differ from those shown in the figures. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A disk drive, comprising:
    a read/write head;
    a disk formatted to define a plurality of data sectors, each associated with a Logical Block Address (LBA); and
    a controller configured to:
        convert an LBA associated with a read error to a corresponding physical location on the disk;
        perform a scan of the corresponding physical location and of nearby physical locations that are within a proximity threshold of the corresponding physical locations to find media defects;
        based on the performed scan, determine if a media scratch is present; and
        relocate at least data sectors associated with the media scratch to a spare location on the disk if the media scratch is determined to be present and relocating a data sector associated with the corresponding physical location to the spare location if a media scratch is determined not to be present.

2. The disk drive of claim 1, wherein the controller is further configured to obtain the LBA associated with the read error by scanning each LBA of a media of the disk drive.

3. The disk drive of claim 2, wherein the controller is further configured to perform the scanning of each LBA as one of a background process and an offline process.

4. The disk drive of claim 2, wherein the controller is further configured to scan each LBA to detect an uncorrectable read error.

5. The disk drive of claim 1, wherein the controller is further configured to obtain the LBA associated with the read error by reading a log of media defects that is updated when a data access command results in a read error during user operations.

6. The disk drive of claim 1, wherein the controller is further configured to convert the LBA associated with the read error to a physical track, head and sector of the LBA associated with the read error.

7. The disk drive of claim 1, wherein the controller is further configured to perform the scan of the corresponding physical location and of nearby physical locations by performing an error correcting code (ECC) scan.

8. The disk drive of claim 7, wherein the ECC scan is configured to determine a number of corrupted bits read from the corresponding physical location and from the nearby physical locations.

9. The disk drive of claim 1, wherein the controller is further configured to update an exception list for any relocated data sectors.

10. The disk drive of claim 1, wherein the proximity threshold is at least one of sectors and tracks of the disk.

11. The disk drive of claim 1, wherein the controller is further configured to scan across at least one of sectors and tracks surrounding the corresponding physical location until no further media defects are found.

12. The disk drive of claim 1, wherein the controller is further configured to determine if a media scratch is present by finding a media defect on two or more adjacent physical locations on the disk.

13. The disk drive of claim 1, wherein the controller is further configured to map the media scratch across at least one of tracks and sectors of the disk.

14. The disk drive of claim 1, wherein the controller is further configured to margin data sectors surrounding the mapped media scratch and to relocate the margined data sectors to the spare location on the disk.

15. A method of operating a disk drive, comprising:
converting an LBA associated with a read error to a corresponding physical location on the media;
performing a scan of the corresponding physical location and of nearby physical locations that are within a proximity threshold of the corresponding physical locations to find media defects;
based on the performed scan, determining if a media scratch is present; and
relocating at least data sectors associated with the media scratch to a spare location on the media if the media scratch is determined to be present and relocating a data sector associated with the corresponding physical location to the spare location if a media scratch is determined not to be present.

16. The method of claim 15, further comprising obtaining the LBA associated with the read error by scanning each Logical Block Address (LBA) of a media of the disk drive.

17. The method of claim 16, wherein scanning of each LBA is performed as one of a background process and an offline process.

18. The method of claim 16, wherein scanning each LBA comprises scanning each LBA to detect an uncorrectable read error.

19. The method of claim 15, further comprising obtaining the LBA associated with the read error by reading a log of media defects that is updated when a data access command results in a read error during user operations.

20. The method of claim 15, wherein converting comprises determining a physical track, head and sector of the LBA associated with the read error.

21. The method of claim 15, wherein performing the scan comprises performing an error correcting code (ECC) scan.

22. The method of claim 21, wherein the ECC scan is configured to determine a number of corrupted bits read from the corresponding physical location and from the nearby physical locations.

23. The method of claim 15, further comprising updating an exception list for any relocated data sectors.

24. The method of claim 15, wherein the proximity threshold is at least one of sectors and tracks of the media.

25. The method of claim 15, wherein performing the scan comprises scanning across at least one of sectors and tracks surrounding the corresponding physical location until no further media defects are found.

26. The method of claim 15, wherein determining if a media scratch is present comprises finding a media defect on two or more adjacent physical locations on the media.

27. The method of claim 15, further comprising mapping the media scratch across at least one of tracks and sectors of the media.

28. The method of claim 27, further comprising margining data sectors surrounding the mapped media scratch and relocating the margined data sectors to the spare location on the media.

* * * * *